No. 762,250. PATENTED JUNE 7, 1904.
W. PORTEN.
APPARATUS FOR MOLDING CONCRETE BUILDING BLOCKS.
APPLICATION FILED NOV. 9, 1903.
NO MODEL. 4 SHEETS—SHEET 1.
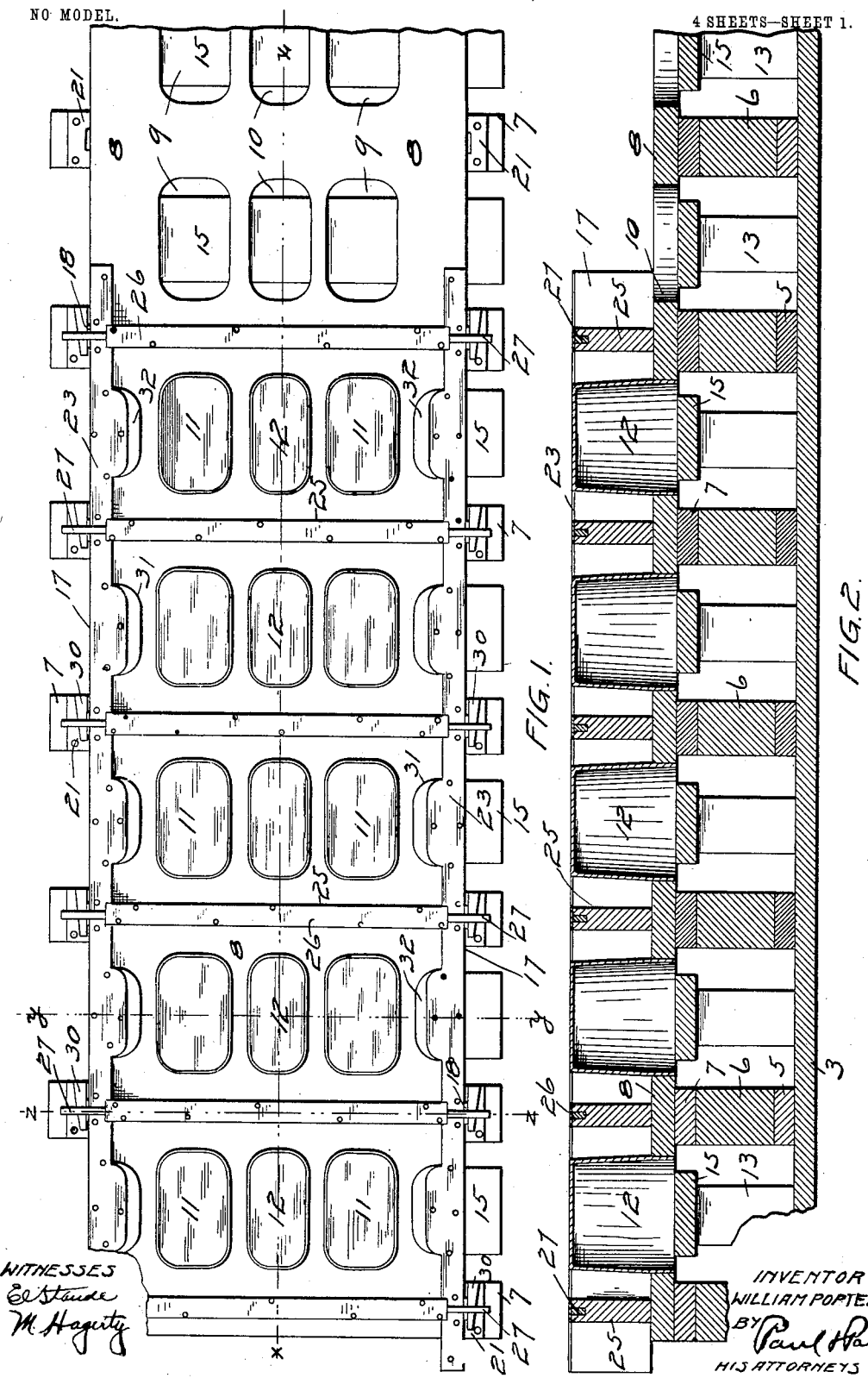
INVENTOR
WILLIAM PORTEN No. 762,250. PATENTED JUNE 7, 1904.
W. PORTEN.
APPARATUS FOR MOLDING CONCRETE BUILDING BLOCKS.
APPLICATION FILED NOV. 9, 1903.
NO MODEL. 4 SHEETS—SHEET 2.
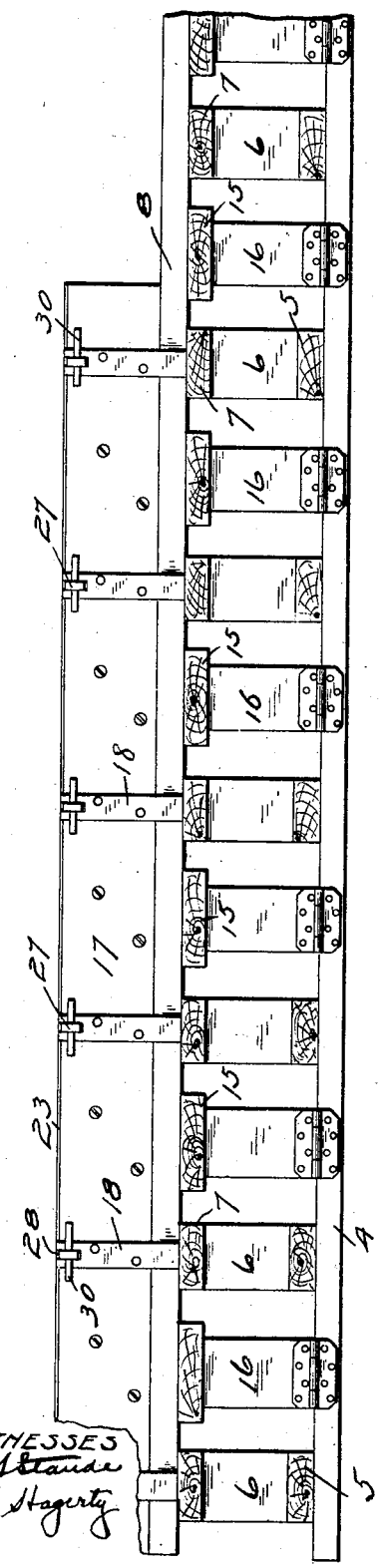
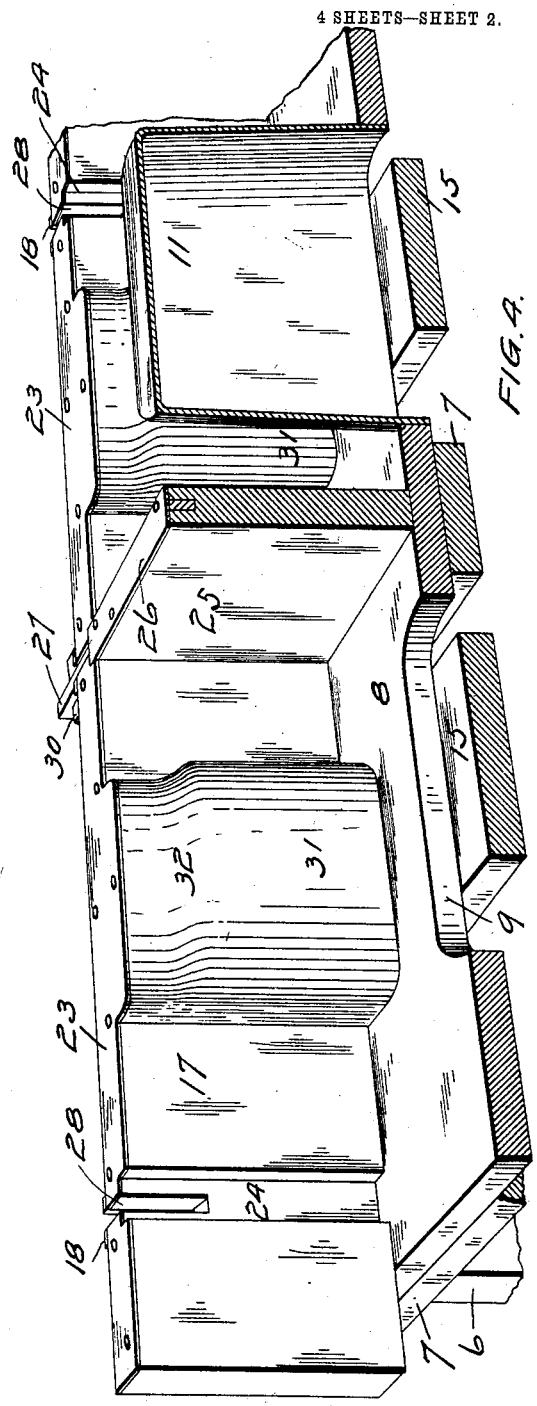
WITNESSES
INVENTOR
WILLIAM PORTEN
BY Paul & Paul
HIS ATTORNEYS

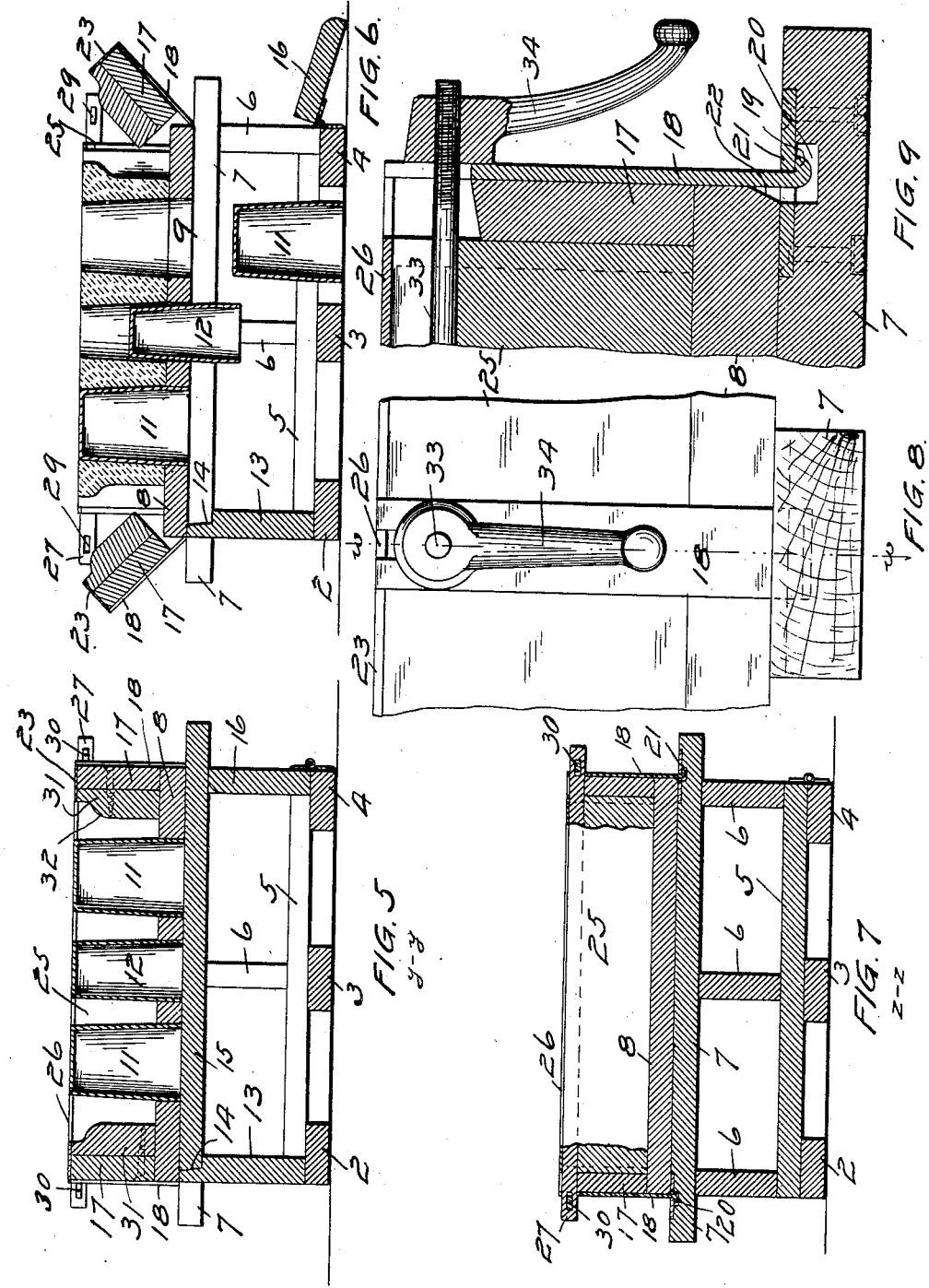

No. 762,250. PATENTED JUNE 7, 1904.
W. PORTEN.
APPARATUS FOR MOLDING CONCRETE BUILDING BLOCKS.
APPLICATION FILED NOV. 9, 1903.
NO MODEL. 4 SHEETS—SHEET 4.
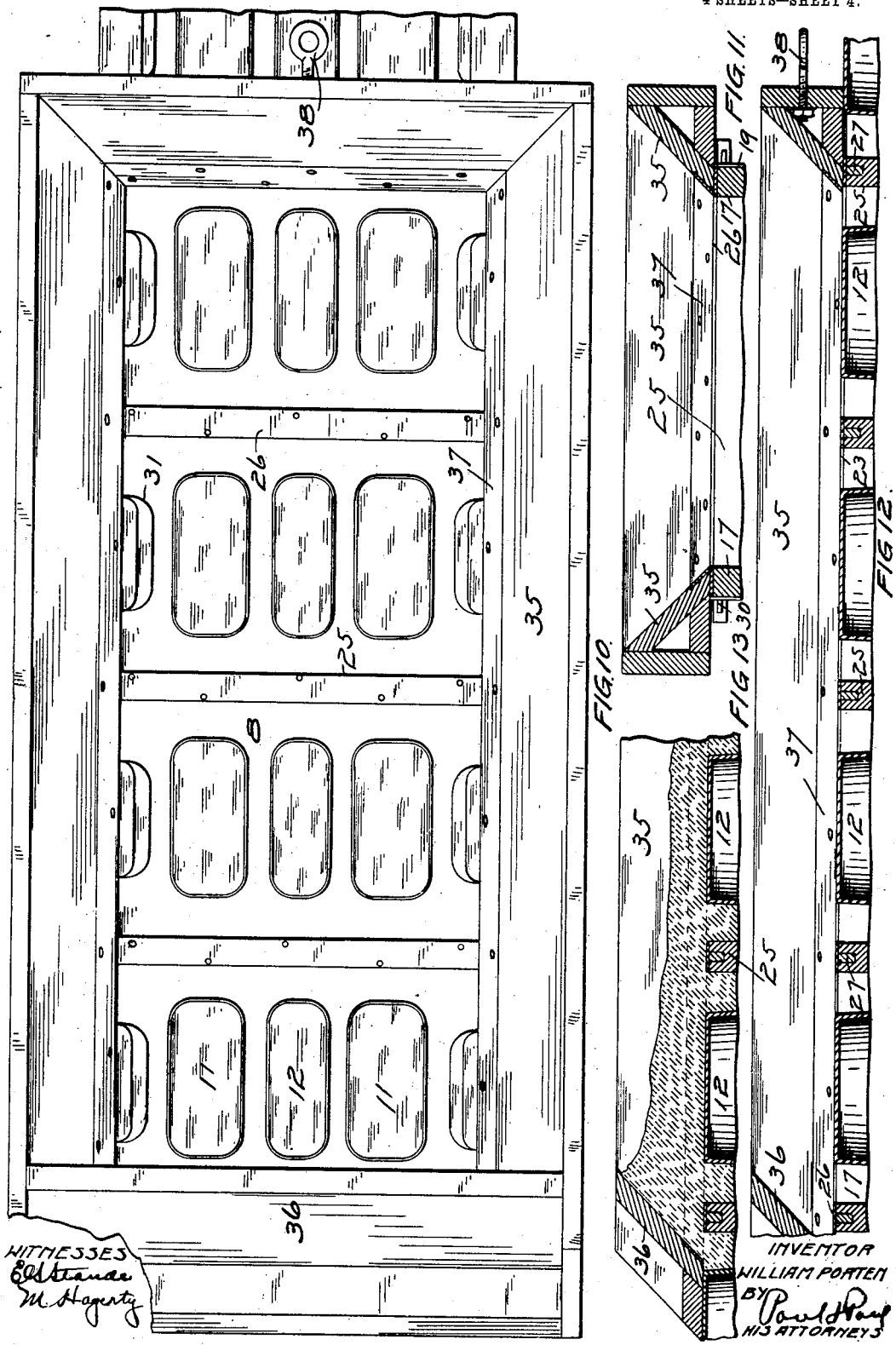
INVENTOR
WILLIAM PORTEN No. 762,250.

Patented June 7, 1904.

UNITED STATES PATENT OFFICE.

WILLIAM PORTEN, OF ST. PAUL, MINNESOTA, ASSIGNOR TO BUILDING BLOCK MANUFACTURING CO., A CORPORATION OF MINNESOTA.

APPARATUS FOR MOLDING CONCRETE BUILDING-BLOCKS.

SPECIFICATION forming part of Letters Patent No. 762,250, dated June 7, 1904.

Application filed November 9, 1903. Serial No. 180,352. (No model.)

*To all whom it may concern:*

Be it known that I, WILLIAM PORTEN, of St. Paul, Ramsey county, Minnesota, have invented certain new and useful Improvements in Apparatus for Molding Concrete Building-Blocks, of which the following is a specification.

The primary object of my invention is to provide an apparatus by means of which a great saving can be effected in the time and labor usually required to mold concrete building-blocks.

A further object is to provide a molding apparatus which will not require the removal of the blocks as fast as molded, as is usually the case in molding-machines as generally made, and consequently all danger of cracking or breaking the blocks through such handling in a green state will be avoided.

The invention consists generally in various constructions and combinations, all as hereinafter described, and particularly pointed out in the claims.

In the accompanying drawings, forming part of this specification, Figure 1 is a plan view of a portion of a block-molding apparatus embodying my invention. Fig. 2 is a longitudinal vertical section of the same substantially on the line *x x* of Fig. 1. Fig. 3 is a side elevation. Fig. 4 is a perspective view, partially in section, showing the relative positions of the side and partition walls and the location of the cores and core-holes. Fig. 5 is a transverse section on the line *y y* of Fig. 1. Fig. 6 is a similar view showing the side walls tilted away from the ends of the blocks and the manner of forcing the cores down through the core-holes after the operation of molding is completed. Fig. 7 is a transverse vertical section on the line *z z* of Fig. 1. Fig. 8 is an outside view of a portion of one of the side walls, showing the modified means for securing the side and partition walls together. Fig. 9 is a section on the line *w w* of Fig. 8. Fig. 10 is a plan view looking down on the molding apparatus and showing the adjustable hopper device thereon. Fig. 11 is a transverse section of the hopper. Fig. 12 is a longitudinal sectional view. Fig. 13 is a section of the rear portion of the hopper, showing the upper part of the mold box or apparatus with the sand tamped therein.

In the drawings, 2, 3, and 4 represent horizontal parallel timbers placed upon the floor or ground and forming a base or support for the molding frame or apparatus. These timbers are connected by a series of cross-bars 5, arranged at suitable intervals throughout the length of the apparatus. Arranged upon these cross-timbers are a series of legs or standards 6, placed at suitable intervals, there being preferably one at each end of said cross-bars and one in the middle. Upon the upper ends of these standards I provide a series of cross-bars 7, whose ends project beyond the lower cross-bars and base-timbers for the purpose hereinafter specified. Upon these cross-bars 7 I arrange a floor or platform 8, that is rectangular in form and extends the full length of the base-timbers.

I do not limit myself to any particular length of platform for the molding apparatus, as it may be varied according to the desired capacity of the plant, the number of workmen employed in molding, and the time required for a block to dry properly after being formed. At this time, however, I find from various experiments that a mold-platform a hundred or more feet in length can be utilized to great advantage in molding building-blocks, and I will therefore assume in the description of this invention that the apparatus shown in the drawings is substantially of that length.

The molding-platform 8 is provided with core-holes 9 and 10, arranged in transverse rows at regular intervals throughout the length of the platform, the holes 9 being a little wider than the holes 10 and located at the ends of the rows with the holes 10 between them.

11 and 12 are cores, preferably of cast metal, open at the bottom and slightly tapered from the bottom toward the top and adapted to fit snugly within said core-holes.

13 represents standards arranged at intervals upon the timber 2 opposite the rows of core-holes beneath the molding-platform and have notches 14 in their upper ends to receive the ends of planks 15, that are temporarily supported at their opposite ends by standards 16, that are hinged on the timbers 4.

In preparing the apparatus for molding the planks 15 are placed between the core-holes with their ends on one side of the apparatus resting in the notches 14. The hinged standards 16 are then swung to a vertical position, as shown in Fig. 5, locking the planks in place between the molding-platform and closing the core-holes therein. The cores are then placed in the holes, resting upon the planks.

The side walls of the apparatus consist of planks 17, adapted to rest upon the longitudinal edges of the platform and provided with transversely-arranged straps 18, preferably of metal, that project below the lower edges of said side walls and have outwardly-turned lower ends 19. (See Fig. 9.) The projecting ends of the cross-bars 7 are provided with recesses 20, that are adapted to receive the lower ends of the straps 18, and plates 21, secured to said bars, overhang said recesses and engage the ends 19 and prevent their disengagement from said recesses as long as the side walls remain in their upright position. The molding-platform has a beveled outer edge 22 overhanging said recesses, which allows the lower ends of the straps 18 to be inserted into the recesses 20 and withdrawn therefrom when said side walls are tilted to an inclined position. (See Fig. 6) When, however, the molding apparatus is in use and the side walls in an upright position on the molding-platform, the lower ends of the straps 18, engaging the plates 21, cannot become accidentally separated and allow a collapse of the apparatus.

I prefer to provide strengthening-plates 23 along the upper edges of the side walls 17, and between the rows of core-holes I provide vertical mortises 24 in said walls, that are adapted to receive the ends of partition-walls 25, that extend across the molding-platform between the rows of core-holes therein and form dividing-walls between the molds. The partition-walls are preferably provided with strengthening-plates 26, and to temporarily secure them to said side walls during the molding operation I provide bars 27, that are set edgewise in the upper edges of the walls 25 and have projecting ends that fit snugly into vertical slots 28 in the side walls 17 and the straps 18 and provided with slots 29 to receive tapered locking-wedges 30.

Upon the inner surface of the plank 17 I provide fixed cores 31, arranged opposite the ends of the transverse rows of core-holes and having shoulders 32 near their upper ends, which when the block is molded will cause the formation of ledges in the upper ends of the grooves formed by said cores in the ends of the blocks. These ledges are to facilitate the lifting of the blocks upon the wall and the placing of the same thereon in their proper position with respect to the other blocks of the course.

In Figs. 8 and 9 I have shown a modification in the manner of securing the side and partition walls together, which consists in providing threaded rods 33 in the partition-walls, projecting out through the slots in the side walls to receive threaded clamping-levers 34. These levers can be readily manipulated by the operator to draw the partition and side walls together preparatory to molding a block or to loosen and separate them after the molding operation has been completed and when it is desired to remove the said walls to another point on the molding-platform.

It is desirable in an apparatus of this kind to provide some means for directing the concrete into the molding-box, and I therefore provide a rectangular hopper-like device 35, whose walls at the sides and forward end are inwardly inclined from the top toward the bottom to direct the material into the molds, while the rear wall 36 is oppositely inclined, so that when the hopper is moved along lengthwise of the mold-platform the concrete engaged by the rear wall will be pressed down into the molds. A metallic frame 37 is preferably provided on the lower edge of the hopper to bear upon the side partition-walls of the mold-boxes, and an eyebolt 38 is preferably provided in the forward end of the hopper, to which a cable may be attached for convenience in moving the hopper along over the mold-boxes.

The manner of using my improved block-molding apparatus is as follows: Assuming that the molding-platform is empty, the operator will first set up the side and partition walls at one end of the molding-platform, securing them together in the manner heretofore described. The planks supporting the cores will then be arranged beneath the core-holes and the cores set up in the holes with their lower ends resting upon the planks. The hopper is then placed in its proper position over the core-boxes, and the material, composed of sand and cement, is dumped into the molds in any suitable way, either by shoveling or by buckets and carriers bringing the material from a distance. As fast as the molds are filled the material is tamped down around the cores, and when the boxes inclosed by the hopper are filled the hopper is moved along over another series of molds. As soon as all the molds have been filled to the ends of the side walls the hopper is removed, and after the tops of the molds have been pressed down and smoothed the core-supporting planks are removed and the cores knocked out into the space beneath the platform. The wedges 30 are then removed and the side walls tilted outwardly until they are disengaged from the partition-walls, when the hooks 19 will be freed from the plates 21, and the said side walls can be lifted up and removed from the molding-platform. The side walls are then carried along and set up at another point on the molding-platform, and the partition-walls and cores having been put in place the operation of molding is repeated. As fast as the blocks are molded the side walls are removed and carried forward and the operation repeated until the end of the molding-platform is reached. The partition-walls are left between the blocks after the molding; but both ends and the core-holes are exposed to the air, and the blocks will dry in a comparatively short space of time without being removed from the molding-platform. The larger-sized blocks will weigh from one hundred and seventy-five to two hundred pounds, and it is therefore a considerable advantage to provide an apparatus whereon the blocks can be left to dry after being molded, when usually in machines of this kind it is necessary to lift each block and remove it from the machine as fast as it is formed. By providing a molding-platform one hundred or two hundred feet in length by the time the workmen beginning at one end of the platform reach the other end the blocks first molded will be sufficiently dry to be piled up in the yard, and by leaving the blocks on the molding-platform during the drying step of the process the danger of breakage arising from handling the green blocks and all labor and time spent in such handling is avoided. By using side walls that are shorter than the molding-platform and adjustable lengthwise thereon instead of having such walls extend the full length of the platform I am able to effect a considerable saving in material and at the same time dry the blocks more rapidly. I have found by molding the blocks in an apparatus of this kind and leaving them on the platform to dry that I not only obtain a more perfect block on account of its not being handled in a green state, but am also able to effect a saving in material over the molding-machine usually employed, wherein a considerable quantity of the cement and sand sift down between the walls and removable floor each time a block is molded.

I have described this apparatus for use in connection with the dry process of molding blocks—that is, where the sand and cement are handled in a comparatively dry state with a shovel; but I do not wish to confine myself to this use, as the apparatus is fully adapted for molding blocks where the material in a liquid state is poured into the molds.

I claim as my invention—

1. An apparatus for molding building-blocks, comprising a platform having a series of core-holes arranged at intervals therein, cores fitting within said holes and means for temporarily supporting them therein, side walls supported on and of less length than said platform, partition-walls arranged between the rows of core-holes, means for securing said partition and side walls together and the latter being readily detachable from said partition-walls and adjustable lengthwise on said platform, for the purpose specified.

2. An apparatus for molding building-blocks, comprising a rectangular elongated platform having a series of core-holes arranged in transverse rows at intervals therein, cores fitting within said holes and means for temporarily supporting them, side walls supported on said platform, partition-walls arranged between the rows of core-holes, and means for securing said partition and side walls together, the latter being readily removable from said partition-walls and platform and adjustable lengthwise of the latter whereby said side walls can be moved along said platform and a new series of molds formed when the preceding series have been filled, substantially as described.

3. An apparatus for molding concrete building-blocks, comprising a platform having a series of core-holes transversely arranged therein, a plank adapted to fit against the under side of said platform beneath said core-holes, means supporting one end of said plank, a hinged standard supporting the other end, cores fitting within said holes and resting upon said plank, and walls arranged upon said platform to inclose the mold formed thereon, substantially as described.

4. An apparatus for molding concrete building-blocks, comprising a platform having a series of core-holes arranged at intervals therein, standards having recesses provided on one side of said platform, planks fitting the under side of said platform beneath said holes and resting at one end in said recesses, hinged standards supporting the other end of said planks, cores resting on said planks in said holes, partition-walls arranged on said platform between the rows of core-holes therein, side walls and means for temporarily securing said side and partition walls together.

5. An apparatus for molding concrete building-blocks, comprising a platform having a series of core-holes arranged at intervals therein, cores fitting within said holes and means for temporarily supporting them therein, cross-bars provided beneath said platform and having recesses in their ends and plates partially covering said recesses, side walls having depending straps provided with outwardly-turned lower ends to enter said recesses and engage said plates, partition-walls provided on said platform between the rows of holes therein, and means for temporarily securing said side and partition walls together.

6. An apparatus for molding concrete building-blocks, comprising a rectangular elongated platform having a series of core-holes arranged in transverse rows at intervals therein, cores fitting within said holes and means for temporarily supporting them therein, side walls mounted on said platform and adjustable lengthwise thereof, partition-walls arranged between the rows of core-holes in said platform and adapted to enter vertical mortises in said side walls, bars provided in said partition-walls to enter slots in said side-walls and means for locking said bars in said slots and drawing said walls together, substantially as described.

7. An apparatus for molding building-blocks, comprising a platform having a series of core-holes arranged at intervals therein, a series of cores adapted to fit within said holes, means for supporting said cores within said holes, side walls arranged lengthwise of said platform, end cores provided on said side walls and having shoulders near their upper ends and being of less depth at the top than at the bottom or middle portion, partition-walls provided on said platform between the rows of holes therein, and means for temporarily securing said side and partition walls together.

8. An apparatus for molding building-blocks, comprising a platform having a series of core-holes arranged in rows at intervals therein, cores fitting within said holes and means for temporarily supporting them therein, said cores being tapered from the bottom toward the top, side walls arranged lengthwise of said platform, end cores having shoulders intermediate their ends arranged opposite the ends of the said rows of cores, partition-walls arranged transversely on said platform between the rows of core-holes therein, and means for temporarily securing said side and partition walls together.

9. An apparatus for molding building-blocks, comprising a floor or platform provided with rows of core-holes at intervals, cores fitting said holes and temporarily supported therein, partition-walls between the rows of core-holes, side walls and end cores provided on said side walls opposite the ends of the rows of core-holes.

10. In a mold for building-blocks, the combination, with a platform having a series of holes therein, cores fitting within said holes, a plate provided beneath said holes and supporting said cores during the molding operation, and fixed and movable supports for said plate.

11. In a mold for building-blocks, the combination, with a platform having a series of holes therein, of cores fitting within said holes, a plate provided beneath said holes and supporting said cores, a support provided beneath said platform and adapted to receive one end of said plate, and a second support hinged at its lower end and arranged to engage the opposite end of said plate.

12. An apparatus for molding building-blocks, comprising a floor or platform provided at intervals with transverse rows of core-holes that are oval in form and suitably spaced from each other, hollow shell-like cores oval in cross-section and tapered from the bottom toward the top and having closed upper ends and open lower ends temporarily fitting said core-holes, means supporting said cores and permitting their independent insertion into the core-holes from above and their discharge therefrom into the space beneath the platform, partition-walls between the rows of core-holes, and side walls mounted on said platform and secured to the ends of said partition-walls.

13. A mold for building-blocks, comprising a platform having a series of core-holes oval in form arranged in rows at intervals therein, cores oval in cross-section having closed upper ends and open lower ends temporarily inserted within said holes from above, means for supporting said cores and permitting them to be discharged independently of each other beneath said platform, partition-walls between the rows of cores, side walls, and means for temporarily securing said side and partition walls together.

14. An apparatus for molding building-blocks, comprising a floor or platform, a movable core thereon, walls inclosing said core, and end cores provided on two of said walls opposite said movable core and having shoulders intermediate to their ends, for the purpose specified.

15. An apparatus for molding building-blocks, comprising a platform, a series of cores in transverse rows thereon, side walls arranged lengthwise of said platform, end cores provided on said side walls and having shoulders intermediate to their ends, partition-walls provided on said platform between the rows of cores, and means for temporarily securing said side and partition walls together.

16. An apparatus for molding building-blocks, comprising a platform having a core-hole, a core temporarily supported therein, walls inclosing said core, means for temporarily securing said walls together, and end cores provided on two of said walls and having shoulders intermediate to their ends, for the purpose specified.

17. An apparatus for molding building-blocks, comprising an elongated floor or platform, a movable core thereon, side and cross or partition walls inclosing said core, the former being of less length than said platform and adjustable longitudinally thereon, for the purpose specified.

18. An apparatus for molding building-blocks, comprising an elongated platform provided at intervals with rows of transversely-arranged core-holes, cores tapered from the bottom toward the top temporarily supported in said holes, partition-walls between the rows of core-holes, and side walls of less length than said platform and adjustable lengthwise thereof and secured to said partition-walls.

19. An apparatus for molding building-blocks, comprising an elongated floor or platform, a series of cores in rows at intervals thereon, partition-walls between the rows of cores, side walls of less length than said platform and means for securing them and said partition-walls together and said side walls being readily detachable from said partition-walls and adjustable lengthwise of said platform to allow the formation of a new series of molds when the preceding series has been filled.

20. A mold for building-blocks, comprising a platform rectangular in form, having a series of core-holes arranged in transverse rows at intervals therein, cores fitting within said holes and means for temporarily supporting them therein, said cores being inserted from above and discharged beneath said platform through said holes independently of each other, partition-walls provided between the rows of cores and dividing said platform into a series of independent molds, side walls arranged lengthwise of said platform, and means for temporarily securing said side and partition walls together.

21. A mold for building-blocks, comprising a platform rectangular in form, having a series of core-holes at intervals therein, cores fitting within said holes and means for temporarily supporting them therein, said cores being inserted from above and discharged beneath said platform through said holes, partition-walls provided between the rows of cores and dividing said platform into a series of independent molds, side walls arranged lengthwise of said platform, and means for temporarily securing said side and partition walls together.

22. A mold for building-blocks, comprising a platform having a series of core-holes, cores adapted to be inserted within said holes from above, means for temporarily supporting said cores and allowing them to be discharged beneath said platform, side and partition walls, and means for temporarily securing them together.

In witness whereof I have hereunto set my hand this 28th day of October, 1903.

WILLIAM PORTEN.

In presence of—
RICHARD PAUL,
M. HAGERTY.